United States Patent
Gunderson

(10) Patent No.: US 8,174,768 B2
(45) Date of Patent: May 8, 2012

(54) OPTICAL ARRANGEMENT FOR TRACKING DETECTOR

(75) Inventor: John Gunderson, Oviedo, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 400 days.

(21) Appl. No.: 12/479,417

(22) Filed: Jun. 5, 2009

(65) Prior Publication Data

US 2011/0170199 A1    Jul. 14, 2011

Related U.S. Application Data

(60) Provisional application No. 61/059,522, filed on Jun. 6, 2008.

(51) Int. Cl.
*G02B 27/14* (2006.01)
(52) U.S. Cl. ........................... 359/629; 359/619
(58) Field of Classification Search ............ 359/619, 359/629
See application file for complete search history.

(56) References Cited

U.S. PATENT DOCUMENTS

| | | | | |
|---|---|---|---|---|
| 3,927,254 A | * | 12/1975 | Lessman | 348/167 |
| 4,422,758 A | | 12/1983 | Godfrey et al. | |
| 4,910,395 A | * | 3/1990 | Frankel | 250/203.3 |
| 5,015,096 A | * | 5/1991 | Kowalski et al. | 356/613 |
| 6,359,681 B1 | | 3/2002 | Housand et al. | |
| 6,606,066 B1 | | 8/2003 | Fawcett et al. | |
| 2003/0133091 A1 | | 7/2003 | Kongable | |

FOREIGN PATENT DOCUMENTS

| | | |
|---|---|---|
| EP | 899586 | 3/1999 |
| EP | 911646 | 4/1999 |
| EP | 924536 | 6/1999 |
| JP | 11287861 | 10/1999 |

\* cited by examiner

*Primary Examiner* — James Greece
(74) *Attorney, Agent, or Firm* — Birch Stewart Kolasch & Birch, LLP

(57) ABSTRACT

A system and method of reducing turbulence sensitivity in a laser spot detector. Embodiments may include using beam splitters, reflectors, and beam deviators. The reflectors may be trihedral reflectors and the beam deviators may be segmented wedge plates having predetermined physical angles and angle directions in each wedge segment designed to produce opposing blurs for each segment of the aperture. A predetermined blur introduced into each line of sight eliminates the need for de-focus, thereby mitigating effects such as centroid shift caused by turbulence or dirty/damaged sensor apertures.

14 Claims, 8 Drawing Sheets

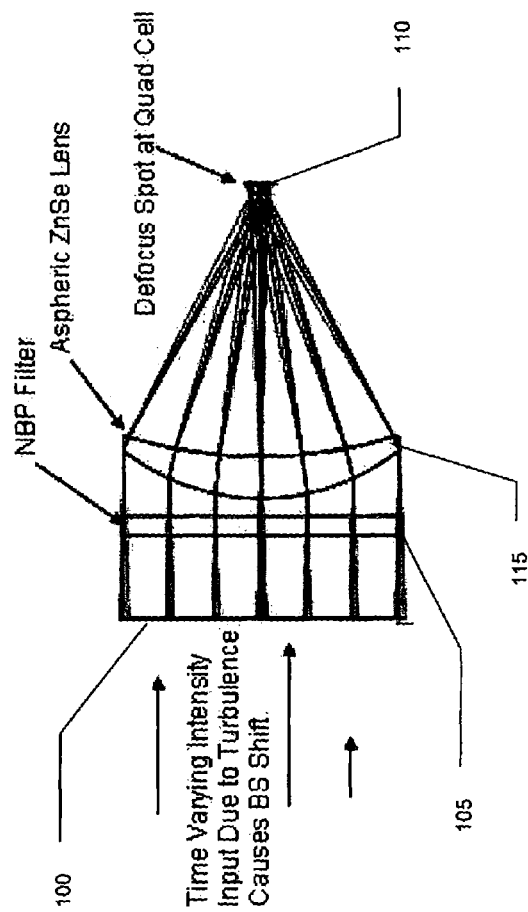

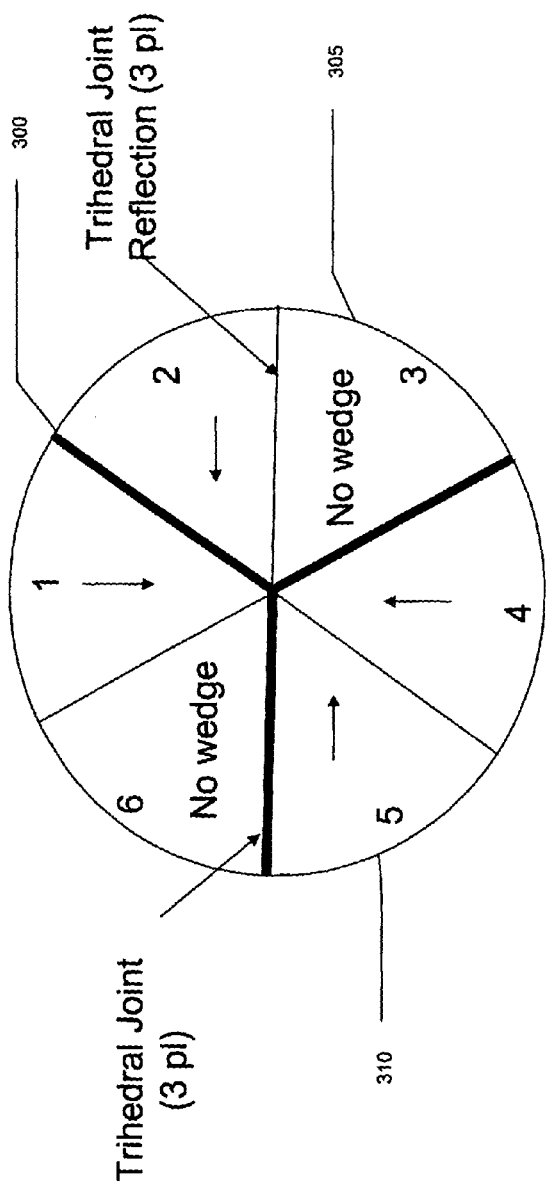

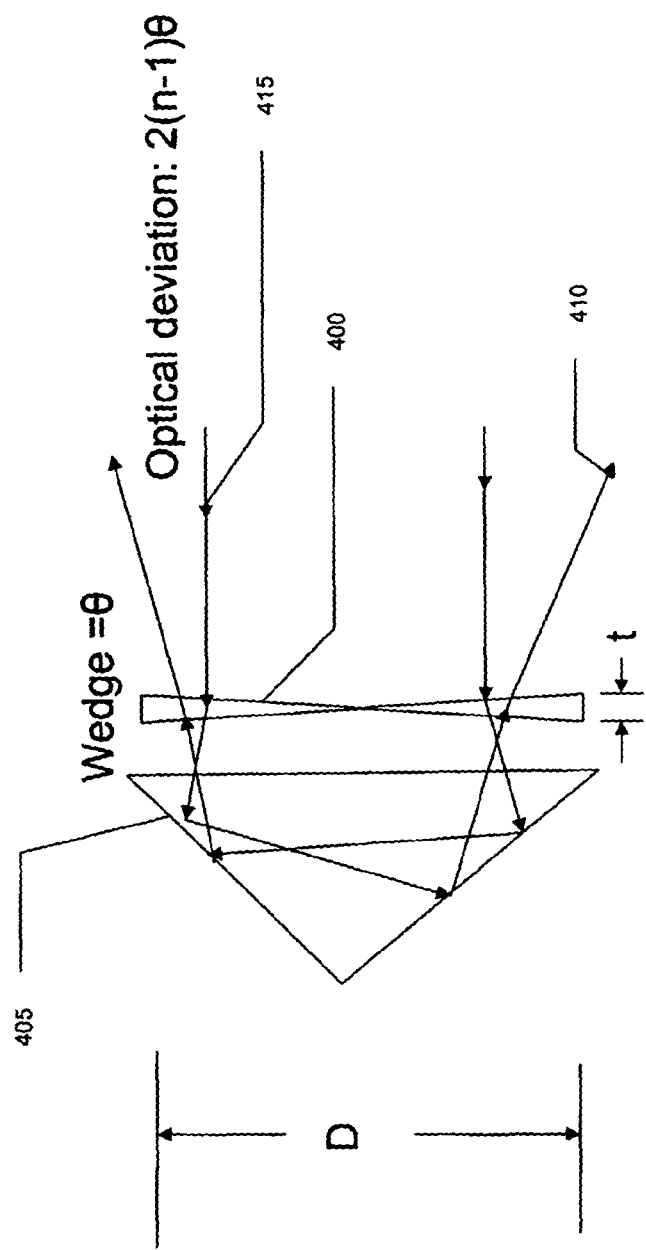

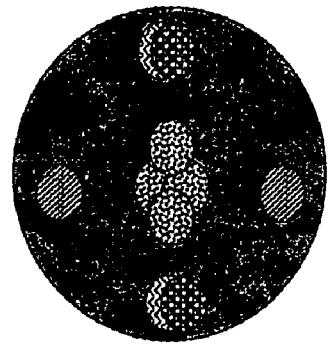
Fig. 6C  Two Trihedrals
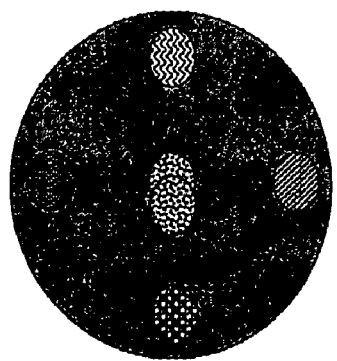
Fig. 6B  One Trihedral
Image Plane Spot @ Detector
(Not to Scale)
Dots slightly displaced to show all dots
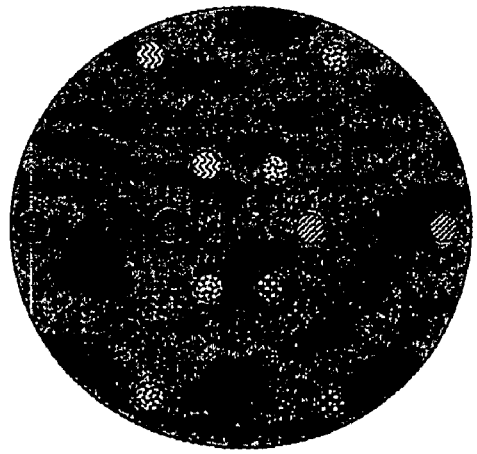
Fig. 6A
Entrance Aperture Image Size on Quad Cell f = focal length of the imaging lens
n = index of refraction of the wedge
θ = physical wedge angle 4f(n-1)θ

OPTICAL ARRANGEMENT FOR TRACKING DETECTOR

PRIORITY

This Non-provisional application claims priority under 35 U.S.C. §119(e) on U.S. Provisional Application No. 61/059,522 filed on Jun. 6, 2008, the entire contents of which are hereby incorporated by reference.

BACKGROUND OF THE INVENTION

A Laser Spot Tracker (LST) for an airborne or a ground system usually employs a proportional quad cell detection mode where all four quadrants of the detection cell have continuous illumination. Some types of laser spot trackers using a four-quadrant detection cell require a relatively large image spot diameter in order to operate in the proportional mode—that is in order to determine an energy centroid in the laser spot and orient themselves accordingly.

When a large spot diameter is achieved with a beam spoiler or similar de-focusing device located in the laser spot tracker, the energy centroid of the detected signal changes position on the quad detector cell as the signal varies over the sensor aperture. An image which is defocused to create a larger spot is sensitive to pointing error due to atmospheric intensity variations or turbulence. These errors may result from atmospheric temperature or pressure gradients between the laser source and the tracking device, or from intervening noise sources such as rain or dust.

The atmospheric turbulence can spread non-uniform reflected laser illumination over the aperture of the sensor. This effect causes the centroid of the laser spot to be incorrectly ascertained on the detector, leading to potential errors in tracking or targeting of munitions and other moving objects. For long range, high-resolution laser spot trackers on a ground vehicle, something as unavoidable as contamination on an external window of the tracker may cause boresight errors that lead to costly and potentially deadly errors in tracking and targeting.

SUMMARY OF THE INVENTION

Embodiments of a laser spot tracker discussed herein may allow an image spot to be tuned and shaped to a detector with minimal sensitivity to turbulence or external window contamination. An embodiment of a turbulence-insensitive laser-spot tracker may include a filter that filters incoming radiation, and a beam splitter that splits the filtered radiation into multiple beams or beam sets.

Embodiments of the filter may include a narrow band pass (NBP) filter configured to admit only certain wavebands of incident radiation associated with a particular type of laser. Alternative embodiments of the filter may include band-gap filters, polarization filters, or other forms of band-pass filtering depending on the type of incoming radiation to be detected. The filter may be a coating applied to an otherwise transparent or translucent material, or may be a component made of a material with particular waveband filtering properties, or combinations thereof. In some embodiments, a filter coating may be applied to the aperture openings or to the beam splitter. Embodiments of a beam splitter may comprise one or more mirrors, or other optical components. Alternative embodiments of a beam splitter may employ dichroic materials or coatings.

The split beams may be directed to multi-faceted retro-reflectors via segmented beam deviators whose segments may be configured to deviate the lines of sight of the beams into a designated image blur based on the deviation angle of the segment. In some embodiments, the retro-reflectors may be trihedral or otherwise configured to be alignment insensitive such that relative movement of the retro-reflectors, beam splitter, deviators, or other components during operation does not result in image splitting or centroid shifts. In yet further embodiments, the deviators may have a number of segments equal to the number of reflector facets.

After deviation and reflection, the beams may be focused by a lens onto a detector for tracking. Such an arrangement may allow for the elimination of a defocus device commonly found in laser spot trackers. Defocusing spreads the entire detected laser signal across the plane of the detector to improve detection sensitivity and servo tracking ability. Defocusing, however, also exacerbates detection errors related to light level variations at the sensor aperture caused by atmospheric effects such as turbulence, fog, or window contamination. The defocus creates a small image of the aperture on the surface of the detector which changes its centroid location as the intensity distribution changes on the sensor aperture. By not having to defocus the beam but instead generating dual opposing laser spot images for each point on the aperture, turbulence effects may be reduced because the image centroid location doesn't change.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF FIGURES

The present invention will become more fully understood from the detailed description given herein below and the accompanying drawings which are given by way of illustration only, and thus are not limitative of the present invention, and wherein:

FIG. 1 depicts an embodiment of a conventional laser spot tracker with a defocusing element;

FIG. 3 depicts an end view of an embodiment of a sight line deviation apparatus looking into a beam deviator aligned with a retro-reflector according to the present invention;

FIG. 4 depicts a cross-sectional side view of an embodiment of a trihedral reflector and beam deviator arrangement configured to create an angular and spatial offset between input and output beams;

FIG. 6A depicts an embodiment of an input aperture depicted with reference dots to show embodiments of beam deviation;

FIG. 6B depicts an embodiment of a projection pattern generated at the focus of the imaging lens on a detector by one deviator mask and one reflector arrangement from one side of a beamsplitter;

FIG. 6C depicts an embodiment of a projection pattern generated on a detector by an arrangement involving two deviators and their associated reflectors from two sides of a beamsplitter;

Figure 2A:
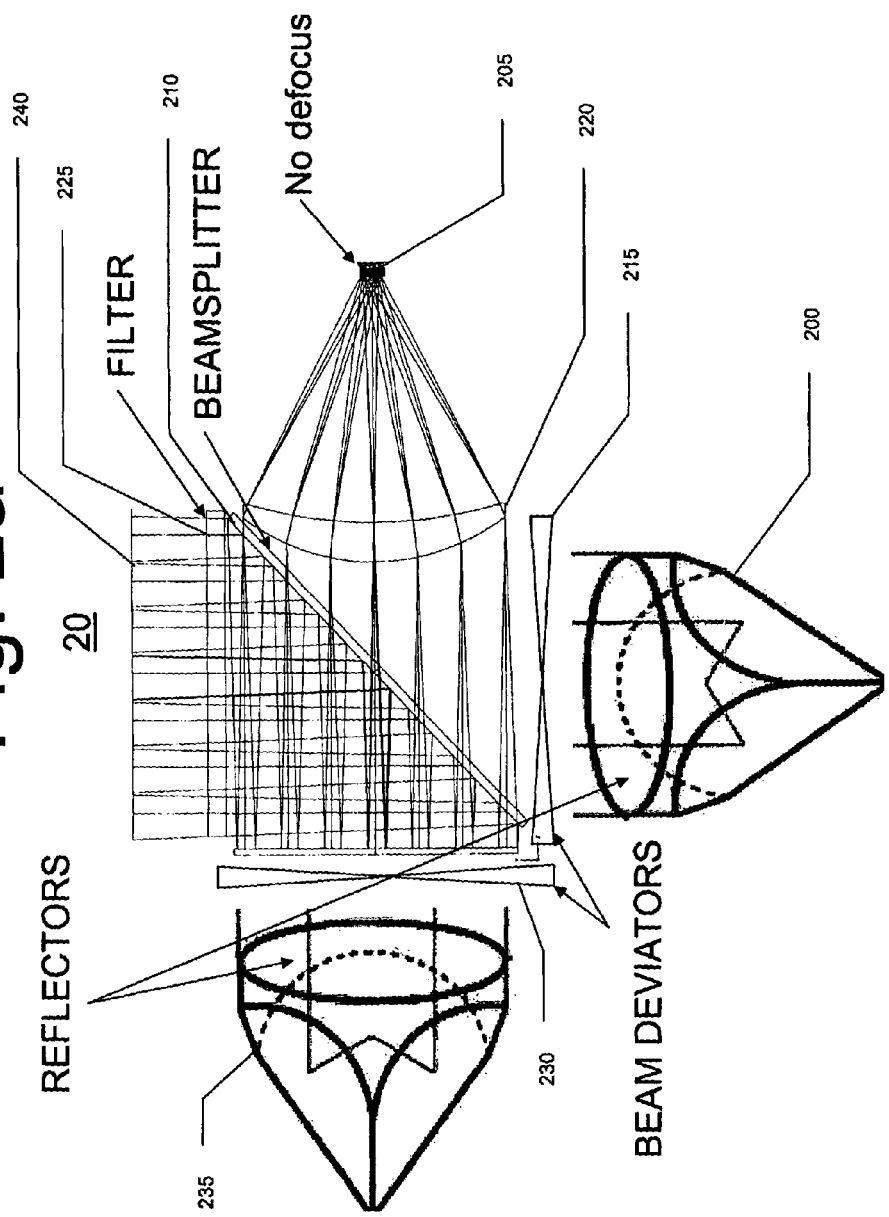
FIG. 2a depicts an embodiment of a laser spot tracker with a sight line deviation arrangement according to the present invention.

The drawings will be described in detail in the course of the detailed description of the invention.

DETAILED DESCRIPTION

The present invention comprises a method and apparatus for the reduction and mitigation of detection errors and inaccuracies in a laser tracking detection system caused by turbulence and other atmospheric conditions.

In a conventional laser spot tracker as shown in FIG. 1, incoming radiation is admitted through an aperture 100 at the front of the tracker 10. The radiation then passes through a narrow band-pass (NBP) filter 105 that removes all but the desired wavebands of laser radiation. The filtered radiation is then focused with a lens 115 onto an intermediate focal plane. The quad-cell detector 110 is located behind the best optical focus so that the defocused image blur fills most of the quad cell array. The effect of this de-focus is to spread the laser spot image across the array to improve detector sensitivity, thereby allowing for more accurate gimbal servo pointing and therefore improved laser spot tracking. An undesirable side-effect of this de-focus, however, is error-producing image jitter and signal variation caused by atmospheric effects such as turbulence or scintillation. With a defocused quad cell, anything that causes non-uniform, time varying aperture illumination will cause gimbal pointing error.

FIG. 2a shows an embodiment of a tracker 20 equipped with an optical system according to the present invention. In the embodiment shown, incoming radiation is admitted through an aperture 240 and then filtered 225 before passing through a beam splitter 210 and being deviated 230, 215 and reflected by a pair of retro-reflectors 235, 200 towards a focusing element 220 that projects the radiation onto a detector 205.

Embodiments of such a tracker may employ a 50% beam splitter, trihedral retro-reflector prisms 235, 200, and/or hexagonally segmented beam deviators 230, 215. The beam deviators may be arranged such that one or more of the segments therein has no associated deviation angle, allowing a beam to pass through it without a significant change in its line of sight. Also, the reflectors and/or the deviators may be aligned at different rotational angles with respect to each other depending on the internal configuration of the tracker and the type of blur pattern desired.

In some embodiments of an optical system as discussed herein, a beam deviator may be positioned such that a beam passes through a first segment of that deviator, is reflected by a trihedral reflector, and then passes through another segment of the deviator again, before being focused by the lens onto the detector. Such a beam deviator/reflector arrangement may be developed for each sight line of each beam or beam set depending on the blur pattern desired.

Alternate embodiments based on alternative forms or sources of radiation, such as infra-red, ultra-violet, visible light, or millimeter-wave, may employ different filters or filtering techniques. Such alternative radiation sources may require additional or different filtering Alternate embodiments may employ hollow multi-faceted reflectors rather than prisms, or band-pass filters to remove only certain wavebands of incoming radiation, wider band-pass filters or multiple band-pass filters to admit multiple wavebands of radiation, or polarization filters. Yet further embodiments may employ a filter coating disposed on the beam splitter 210 or the aperture 240 instead of, or in addition to, a separate filter component 225, or may use aperture windows 240 or beam splitters 210 composed of, or containing, materials with particular spectral filtering properties. In yet further embodiments, the aperture window 240 may be the external environmental window.

Embodiments of the beam splitter 210 may include arrangements of mirrors or prisms or may include a one-way minor or a transparent or translucent component having a thin film coating which produces partial transmission and partial reflection.

In the embodiment depicted, the beam splitter 210 used is a reflecting component positioned to capture half of the radiation entering the aperture 240 and direct it towards a sight line deviation arrangement composed of a beam deviator 230 and a trihedral reflector 235. The portion of the incoming radiation not diverted by the beam splitter 210 after filtering passes to a second sight line deviation arrangement, which is also composed of a beam deviator 215 and a reflector 200. In some embodiments, the beam splitter may be a 50% beam splitter. For one-way mirror or film-coated embodiments of 50% beam splitters, the mirror or coating should preferably produce 50% transmission and 50% reflection.

In yet further embodiments of an optical system as discussed herein, the beam deviators may be segmented wedge plates containing a plurality of pie shaped segments. These pie shaped segments may each be configured with a particular physical wedge angle corresponding to a desired deviation angle. In some embodiments, the wedge plates may be oriented rotationally to the segments of a multi-faceted retro-reflector and sized according to the size of the retro-reflector. Also, in embodiments having multiple wedge plates, the plates may have different arrangements of wedges and wedge angles, or they may be clear with zero wedge angle, or they may be identical plates in different positions and different relative rotational orientations.

Figure 5:
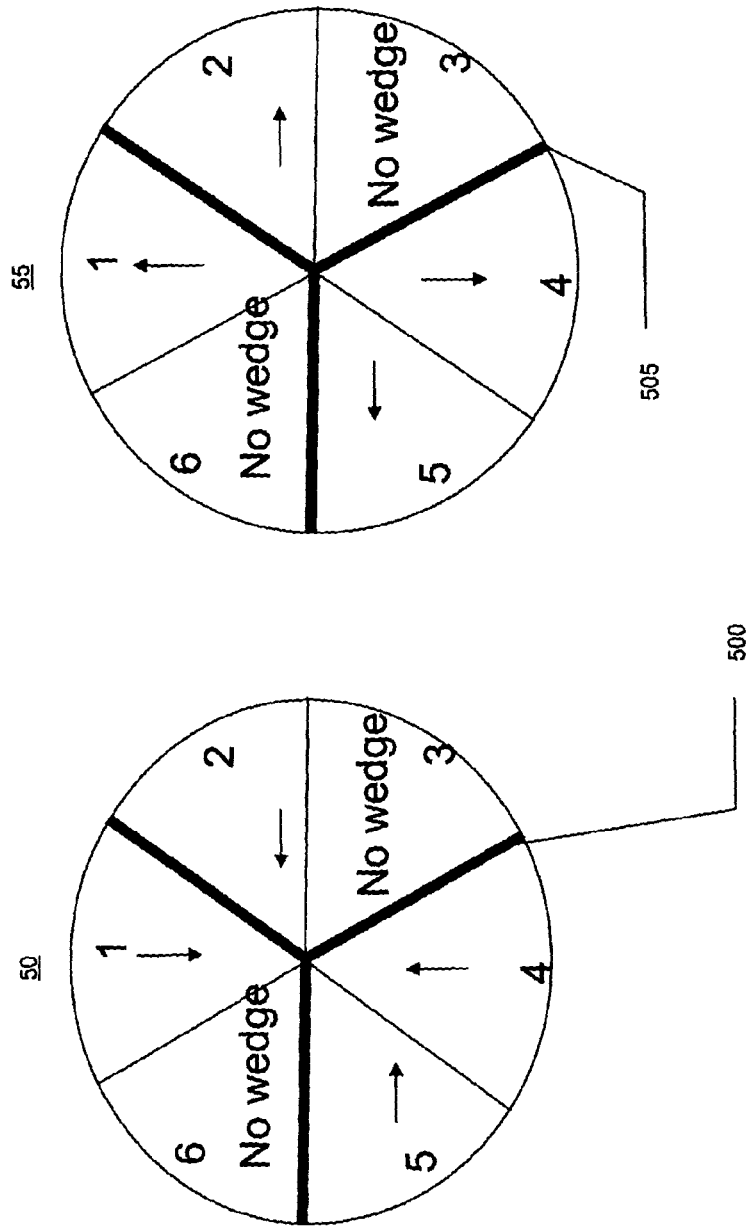
FIG. 5 depicts an embodiment of two sight line beam deviation masks configured with opposing wedge orientations in order to produce opposite angular spreads.

In the embodiment depicted, the beam deviators 215, 230 are identified as hexagonal wedge plates, some of whose segments have wedge angles directed towards the center of the wedge plate, radially outward from the center, or in any other direction as is desired to produce a specified shape at the quad cell. Embodiments of such wedge plates may be fabricated from plastic sheeting or may be cookie-cut from sheets of molded wedge material. Alternative embodiments may be injection molded, cut from large wedged blocks of transparent material, or fabricated or assembled in other appropriate ways. Some embodiments may be assembled from individual wedge segments. Embodiments of a wedge plate having all wedge angles the same may be fabricated from a single wedge block. Embodiments of wedge plates have some of the above-discussed properties are depicted in FIGS. 3 and 5 and will be discussed in more detail in subsequent portions of this document. Yet further embodiments may include beam deviators composed of materials or covered with coatings that have spectral filtering properties. Further embodiments still may employ beam deviators composed of or coated with materials having anti-reflection properties.

In the embodiment depicted in FIG. 2, the beam deviators 230, 215 are disposed in front of reflectors 235, 200. In some embodiments, the reflectors depicted and identified in FIG. 2a may be trihedral prisms otherwise known as corner cube reflectors, or retro-reflectors 235, 200. Corner cubes are multi-faceted reflectors that may be used to create a spatial offset with exactly 180 degrees of angular deviation in the beams reflected thereby. In the particular embodiment depicted, each corner cube has 3 reflective faces associated with 6 pie shaped beam deviation segments as seen when looking into one. The particular arrangement depicted in this embodiment causes each incoming beam of radiation to pass through a wedge plate segment, thereby being deviated based on the wedge angle of the segment, enter the trihedral reflector at a certain point on the reflector face, get offset and emitted from a different point on the reflector face, and pass through a different wedge plate segment that has a potentially different wedge angle, thereby potentially being further deviated.

Alternative embodiments may employ different types of reflectors, such as flat mirrors. Embodiments employing planar reflectors instead of multi-faceted reflectors such as the trihedral ones depicted in FIG. 2a may be mounted on an especially stable mounting to compensate for the relatively higher alignment sensitivity exhibited by flat reflectors as opposed to multi-faceted ones. Embodiments employing corner-cube reflectors may be alignment insensitive, allowing for a less expensive and less precise mounting or permitting for a higher degree of relative movement between the beam splitter and the corner cubes without causing image splitting.

After undergoing the desired deviation and re-direction, the beams or beam groups may be directed to a focusing device 220, such as a lens, that projects the beams onto a detector 205 for imaging. Preferably, the detector 205 is a quad-cell detector, but alternative detectors, such as an array of PIN diodes or a staring focal-plane array, may also be employed depending on the radiation being detected and the particular requirements of the object being tracked or the system doing the tracking.

Figure 2B:
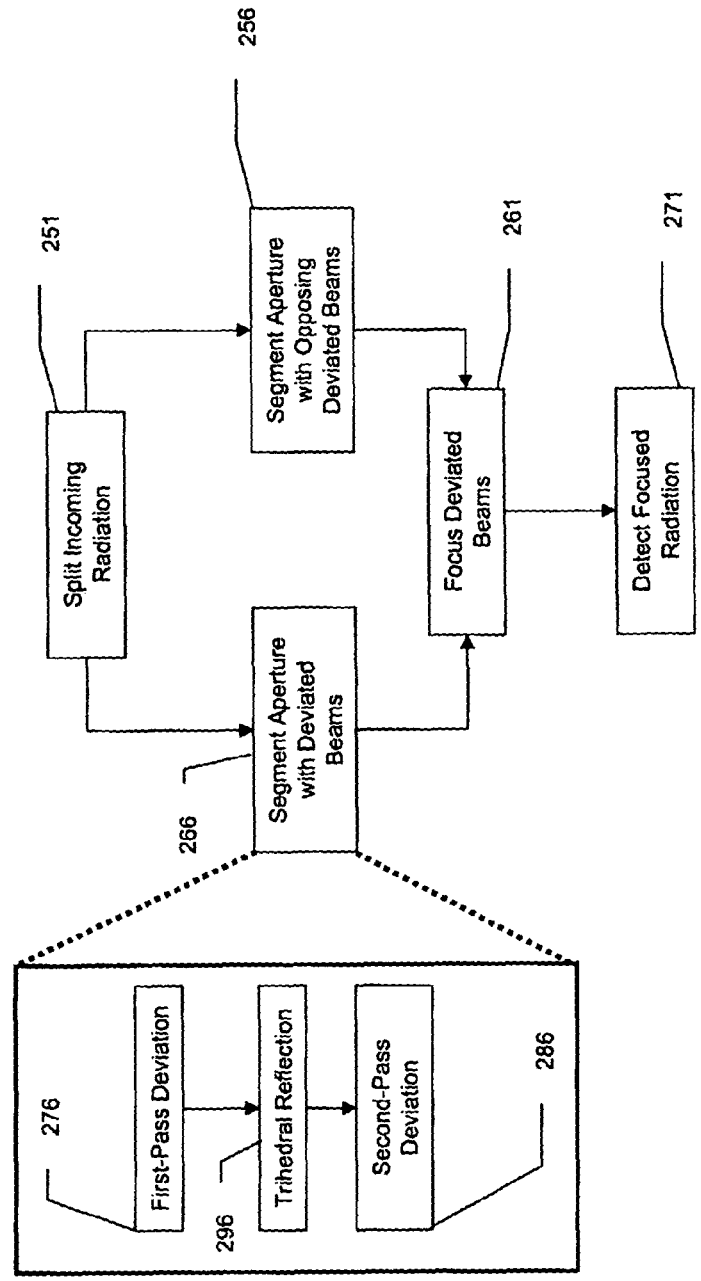
FIG. 2b depicts an embodiment of a flowchart showing a possible sequence of operations in a beam deviation process according to the present invention.

FIG. 2b shows an embodiment of a beam deviation process associated with possible embodiments of optical systems described herein. Incoming radiation is split 251 into two or more beam sets. The beam splitting 251 may include or be preceded or followed by a filtering operation (not shown) in various alternative embodiments. Filtering may include narrow band pass filtering, polarization filtering, or band gap filtering depending on the type of radiation being detected and the particular purpose of a detector associated with an optical system.

In the embodiment shown, beam splitting 251 generates two beam sets, each of which is then separately subjected to sight line deviation 266, 256. Embodiments of either or both sight line deviation 266, 256 steps may include single or multiple passes through a beam deviator 230, 215 as shown in FIG. 2a, and may also involve a step of reflecting all or part of a beam set 296 after an initial deviation 276 for one or more subsequent deviations 286.

Embodiments of the deviation method may create opposing blurs for different beam sets. A first beam set may be deviated with a first particular deviation 266 imparting a particular image blur, whereas a second beam set may be deviated with an opposing deviation 256 such that the image blur and disposition of the second beam set on a focal plane may be the opposite, or mirror-image, of the image blur and disposition of the first beam set on the focal plane.

Embodiments of a reflection step 296 may include trihedral reflection or may include alternative, alignment-sensitive forms of reflection.

After deviation, embodiments of a beam deviation process may focus the deviated beams 261 onto a focal plane array or other detector (not shown) where the beams are detected 271. Embodiments of such a process endow each deviated beam set with a particular blur pattern that eliminates the need for wholesale beam de-focus, thereby mitigating detection errors associated with things like centroid shift that may accrue from atmospheric effects or dirt or damage to a sensor aperture.

FIG. 3 shows an embodiment of a beam deviator that may be employed in an embodiment of a tracker 20 as shown in FIG. 2. The particular embodiment shown in FIG. 3 is a hexagonal wedge plate 30 type of beam deviator. In the embodiment depicted, different segments 310, 305 have different directions of wedge angles associated with them as depicted by the direction of the arrows. The magnitude of the wedge angles themselves are all equal in the embodiment shown. Alternative embodiments, however, may have different wedge angle magnitudes as well as, or instead of, different wedge angle directions. One segment 310 may have a wedge angle that narrows towards the center of the plate whereas a different segment 305 may have no wedge angle at all. Embodiments of zero wedge angle segments 305 may be created with a blank air space or by a plane parallel material used to physically connect the other wedge segments for purposes of ease of manufacture and mounting. Yet further embodiments may have wedge angles that expand towards the center of the plate or vice versa or wedge angles that are not in the radial direction of the wedge.

Embodiments of segmented wedge plates may be fabricated as part of a plastic sheet or they may be cookie-cut from molded sheets of a single wedge angle material. The wedge material may be a clear plastic or polymer such as polyethylene, polystyrene, or polycarbonate or may be optical glass. The physical wedge angle may be an expanding angle from the inside of the wedge plate towards its edge, or may be directed in the opposite or different directions depending on the particular blur pattern and beam deviation pattern desired. In certain embodiments, the wedge angle of each segment may be tuned to the detector size. In the preferred embodiment, each wedge segment has the same wedge angle.

The reflector joint 300 shown indicates a rotational alignment between the wedge plate and an embodiment of an associated trihedral reflector according to the embodiment depicted in FIG. 3. In such an embodiment, a beam passing through wedge 1 would, after reflection, pass through wedge 4. The physical wedge angles of wedges 1 and 4, in such an embodiment, would have a cumulative effect on the overall deviation and blur of a beam passing through them, as depicted in FIG. 4. In alternative embodiments, a wedge plate may be configured with only three wedge segments. Such embodiments may be more suitable for lower-cost devices or in embodiments having good physical alignment between the wedge plate and its associated reflector. In some embodiments of a collapsed wedge plate, the wedge angles of each wedge segment may need to be altered to preserve a desired beam deviation and blur effect with a reduced number of wedge segments.

FIG. 4 depicts an embodiment of a corner cube and wedge plate beam deviation arrangement that illustrates examples of beam deviation and offset. When passing through a wedge segment 400 with a particular peripheral thickness t and a wedge angle $\theta$, a beam of incident radiation 415 is refracted by a particular amount. The refracted beam is then offset by the corner-cube reflector 405, with the amount of offset being determined by a width D of the reflector and the entry point and angle of the deviated beam. The offset beam, in such an embodiment, then passes through a different wedge of the segmented wedge plate. This different wedge may have a same or different thickness and wedge angle as the first wedge 400. In the embodiment depicted, the thickness and wedge angle of the different wedge is the same as that of the first wedge. The beam leaving the second wedge 410 therefore has an overall optical deviation equal to the $2(n-1)\theta$, where n is the refractive index of the wedge segment or segments having a wedge angle of θ. For alternative embodiments where a beam passes through wedge segments of differing wedge angle, or only passes through a single wedge segment, or passes through more than two wedge segments, the optical deviation calculation may be represented differently. Also, embodiments where different wedge segments are composed of different materials or otherwise possessed of differing refractive qualities may further alter or complicate the computation of an optical deviation.

FIG. 5 depicts an embodiment of two segmented wedge plates with reversed segment wedge angles. The segments are numbered and oriented such that each segment number on each wedge plate corresponds to light from same section of the aperture being split into two amplitudes by the beamsplitter 210 shown in FIG. 2. As in FIG. 3, the trihedral reflector joints 500, 505 shown on the two wedge plates 50, 55 indicate the rotational alignment between the wedge plates and their respective associated reflectors. The trihedral reflector joint may not be an actual physical structure of the wedge plate and instead merely represented with a heavier line in the diagram for illustrative purposes. Certain of the beams deviated by the first wedge plate 50 may be overlapped, on a detector, with beams deviated by the second wedge plate 55.

FIG. 6A depicts an embodiment of an entrance aperture showing a selection of conceptual ray paths. Two ray paths are shown for each segment of an embodiment of a hexagonal wedge plate. The particular embodiment depicted shows twelve ray paths, with the ray paths being identified with different patterns for ease of illustration.

FIG. 6B depicts an embodiment of beam projection ray paths from the aperture at FIG. 6A when they arrive at the detector. This is based on the deviations of the hexagonal wedge plate, the trihedral reflector, the beamsplitter, and the imaging lens. The one trihedral reflector embodiment shown indicates that for six incoming beams, four of the beams will be individually projected onto the detector image plane while two of the beams will be overlapped. The second same pattern ray path from each aperture segment is also overlapped, but not shown separately.

FIG. 6C depicts an embodiment of a beam projection pattern based on the sum of the ray paths for both trihedral reflectors and their associated wedge plates. The two trihedral reflector embodiment depicts an additional mirror image of the beams projected by the one corner-cube embodiment projected onto the detector. The mirror image pattern arises in embodiments configured for wedge reversal between the two wedge plates. In the embodiment depicted, the beams are overlapped, creating an artificial image blur which doesn't correspond to the aperture. In such an embodiment, each point on the aperture is mapped into two opposite positions on the detector. If one area of the aperture dims due to turbulence or is blocked by window contamination, then the two opposing spots from that hexagonal segment both dim together with no change in the image centroid. By contrast, a defocused beam projected directly without selective beam path deflection does not dim uniformly. This may cause in a change in the image centroid and an error in the tracking angle.

Figure 7:
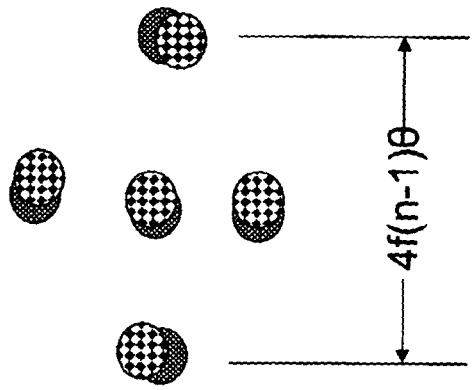
FIG. 7 depicts a projection pattern generated on a detector by a deviator and reflector arrangement according to the present invention.

As shown in FIG. 7, the particular size of projected image on a detector in embodiments of trackers described herein may be determined by a combination of the refractive index of the material used in an embodiment of beam deviation arrangement, the angle of a wedge segment of a wedge-plate type beam deviator, and the focal length of an imaging lens or other focusing device used to project the deviated radiation onto a detector. In the particular embodiment depicted, the detector may be a quad-cell detector. Alternative embodiments may use different types of detectors depending on the particular needs of the tracking solution being developed or implemented. Yet further embodiments may employ beam deviators which cause different image patterns than the one pictured in FIG. 7. They may generate images having varying degrees of beam overlap, no beam overlap, or images not split into beams or beam groups at all.

Embodiments of such a method may include deviating the sight lines of at least one of the split beams at a particular deviation angle to generate a desired image blur. In embodiments where incoming radiation is split into multiple beam sets, each beam set may be subject to a particular deviation or arrangement of beam deviations. In alternative embodiments, each beam may be subjected to a particular deviation.

After being deviated to generate the desired blur pattern, the beams may be focused onto a detector for tracking. Embodiments of the detection aspect may include detection with a four-quadrant detector. Alternative embodiments may employ specific arrays or arrangements of PIN diodes or other photo-detecting measures.

In some embodiments, the beam deviation process may involve or be associated with beam reflection as well. A beam may be partially deviated, reflected, and then deviated further before focusing and detection. Embodiments of the beam deviation process may involve different degrees of deviation for different beams, which may be accomplished with components such as the segmented wedge plates discussed above. Embodiments of beam deviation may include placing beam deviators and, in applicable embodiments, reflectors, at different rotational orientations with respect to each-other. Embodiments of reflectors may include trihedral reflectors as discussed above. Further beam input and output offsets may be accomplished during embodiments of such a deviation process by changing the angles of the trihedral or wedge plates or using a loose tolerance trihedral reflector to produce a deviated beam without a wedge plate.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. An optical system for a tracking sensor, the optical system comprising:
   a beam splitter that splits the incoming radiation into a first beam set and a second beam set;
   a first reflector having a plurality of facets and first reflector aperture, said first reflector being in optical communication with said beam splitter;
   a second reflector having a plurality of facets second reflector aperture, said second reflector being in optical communication with said beam splitter;
   a first segmented beam deviator having at least one segment that deviates lines of sight of the first beam set into a first designated image blur according to a first deviation angle, said first segmented beam deviator having a predetermined number of segments and being in optical communication with said beam splitter and said first reflector;
   a second segmented beam deviator having at least one segment that deviates lines of sight of the second beam set into a second designated image blur according to a second deviation angle, said second segmented beam deviator also having the predetermined number of segments and being in optical communication with said beam splitter and said second reflector;

a lens in optical communication with said first and second reflectors, said lens focusing said first and second beam sets onto a focal plane and the first and second reflectors are trihedral reflectors.

2. The system of claim 1, where the beam splitter is a 50% beam splitter.

3. The system of claim 1, where at least one segmented beam deflector is hexagonally segmented.

4. The system of claim 1, where at least one segment of said first segmented beam deflector has a deviation angle of zero degrees.

5. The system of claim 1, where the reflectors are positioned at a particular rotational angle with respect to each other.

6. The system of claim 1, where:

said first segmented beam deviator is positioned such that said first beam set passes through said first segmented beam deviator, is reflected by said first reflector, and then passes through said first segmented beam deviator again before being focused by said lens onto said focal plane; and said second segmented beam deviator is positioned such that said second beam set passes through said second segmented beam deviator, is reflected by said second reflector, and then passes through said second segmented beam deviator again before being focused by said lens onto said focal plane.

7. The system of claim 1, the system further including a detector disposed at said focal plane.

8. The system of claim 7, where the detector is a four-quadrant detector.

9. The system of claim 5, where the first segmented beam deviator is positioned at the particular rotational angle with respect to the second segmented beam deviator.

10. The system of claim 1, where said first and second segmented beam deviators are segmented wedge plates containing a plurality of wedge-shaped segments; and where said first segmented wedge plate has a segment with a first physical wedge angle corresponding to said first deviation angle and said second segmented wedge plate has a segment with a second physical wedge angle corresponding to said second deviation angle.

11. The system of claim 10, where the wedge segments of said segmented wedge plates are part of a single, molded component.

12. The system of claim 11, where said first and second physical wedge angles are the same.

13. The system of claim 1, the system further including a filter that filters incoming radiation.

14. An optical system for a tracking sensor, the optical system comprising:

a beam splitter that splits the incoming radiation into a first beam set and a second beam set;

a first trihedral reflector having a plurality of facets and first reflector aperture, said first reflector being in optical communication with said beam splitter and said first reflector including a first beam deviation portion that deviates lines of sight of the first beam set into a first designated image blur;

a second trihedral reflector having a plurality of facets and a second reflector aperture, said second reflector being in optical communication with said beam splitter and said second reflector including a second beam deviation portion that deviates lines of sight of the second beam set into a second designated image blur that is an opposing image blur of the first designated image blue;

a lens in optical communication with said first and second reflectors; and a four-quadrant detector in optical communication with said lens.

\* \* \* \* \*